US011292582B2

(12) United States Patent
Budnitsky et al.

(10) Patent No.: US 11,292,582 B2
(45) Date of Patent: Apr. 5, 2022

(54) ASSEMBLIES AND METHODS FOR DEPLOYING A TRAILING EDGE FLAP OF AN AIRCRAFT

(71) Applicant: BOMBARDIER INC., Dorval (CA)

(72) Inventors: Dmitry Budnitsky, Ancaster (CA); Howard Ian Smith, Niagara Falls (CA); Thomas Hanson, Ballwin, MO (US)

(73) Assignee: BOMBARDIER INC., Dorval (CA)

( * ) Notice: Subject to any disclaimer, the term of this patent is extended or adjusted under 35 U.S.C. 154(b) by 454 days.

(21) Appl. No.: 16/312,336

(22) PCT Filed: Jun. 27, 2017

(86) PCT No.: PCT/US2017/039557
§ 371 (c)(1),
(2) Date: Dec. 21, 2018

(87) PCT Pub. No.: WO2018/005534
PCT Pub. Date: Jan. 4, 2018

(65) Prior Publication Data
US 2019/0233081 A1      Aug. 1, 2019

Related U.S. Application Data

(60) Provisional application No. 62/356,930, filed on Jun. 30, 2016.

(51) Int. Cl.
*B64C 9/16*      (2006.01)
*B64C 9/02*      (2006.01)

(52) U.S. Cl.
CPC .................. *B64C 9/16* (2013.01); *B64C 9/02* (2013.01); *Y02T 50/30* (2013.01)

(58) Field of Classification Search
CPC .... B64C 9/16; B64C 9/02; B64C 9/18; B64C 9/20
See application file for complete search history.

(56) References Cited

U.S. PATENT DOCUMENTS 4,172,575 A * 10/1979 Cole .......................... B64C 9/16
244/216
4,248,395 A *  2/1981 Cole .......................... B64C 9/20
244/216

(Continued)

FOREIGN PATENT DOCUMENTS

| EP | 2593361 B1 | 5/2014 |
| EP | 2886451 A1 | 6/2015 |
| WO | 2014209714 A1 | 12/2014 |

OTHER PUBLICATIONS

Rudolph, High-Lift Systems on Commercial Subsonic Airlines, NASA Contractor, Report 4746, Sep. 1996, USA.

(Continued)

*Primary Examiner* — Nicholas McFall
*Assistant Examiner* — Marisa V Conlon
(74) *Attorney, Agent, or Firm* — Norton Rose Fulbright Canada LLP

(57) ABSTRACT

Trailing edge assemblies, couplers and methods for deploying a trailing edge flap of an aircraft wing are disclosed. An exemplary method disclosed herein comprises guiding an aft portion of the trailing edge flap (28) along an elongated track member (36C) as the trailing edge flap (28) moves toward the deployed position; guiding a forward portion of the trailing edge flap (28) along the elongated track member (36C) as the trailing edge flap (28) moves toward the deployed position; and accommodating transverse movement of the forward portion of the trailing edge flap (28) relative to the elongated track member (36C).

17 Claims, 12 Drawing Sheets

(56) References Cited

U.S. PATENT DOCUMENTS

| | | | |
|---|---|---|---|
| 4,669,687 A | | 6/1987 | Rudolph |
| 4,995,575 A | | 2/1991 | Stephenson |
| 5,161,757 A | * | 11/1992 | Large .................. B64C 9/16 244/213 |
| 7,500,641 B2 | | 3/2009 | Sakurai et al. |
| 8,070,106 B2 | | 12/2011 | Engelbrecht et al. |
| 8,302,913 B2 | | 11/2012 | Schlipf |
| 8,876,065 B2 | | 11/2014 | Grieco et al. |
| 9,452,823 B2 | * | 9/2016 | Havar .................. B64C 9/16 |
| 9,540,095 B2 | * | 1/2017 | Ferreira ............... B64C 9/16 |
| 10,040,540 B2 | * | 8/2018 | Bishop ................. B64C 9/16 |
| 2009/0134281 A1 | | 5/2009 | Engelbrecht et al. |

OTHER PUBLICATIONS

PCT International Search Report and Written Opinion dated Oct. 5, 2017, re: International Application No. PCT/US2017/039557.

\* cited by examiner

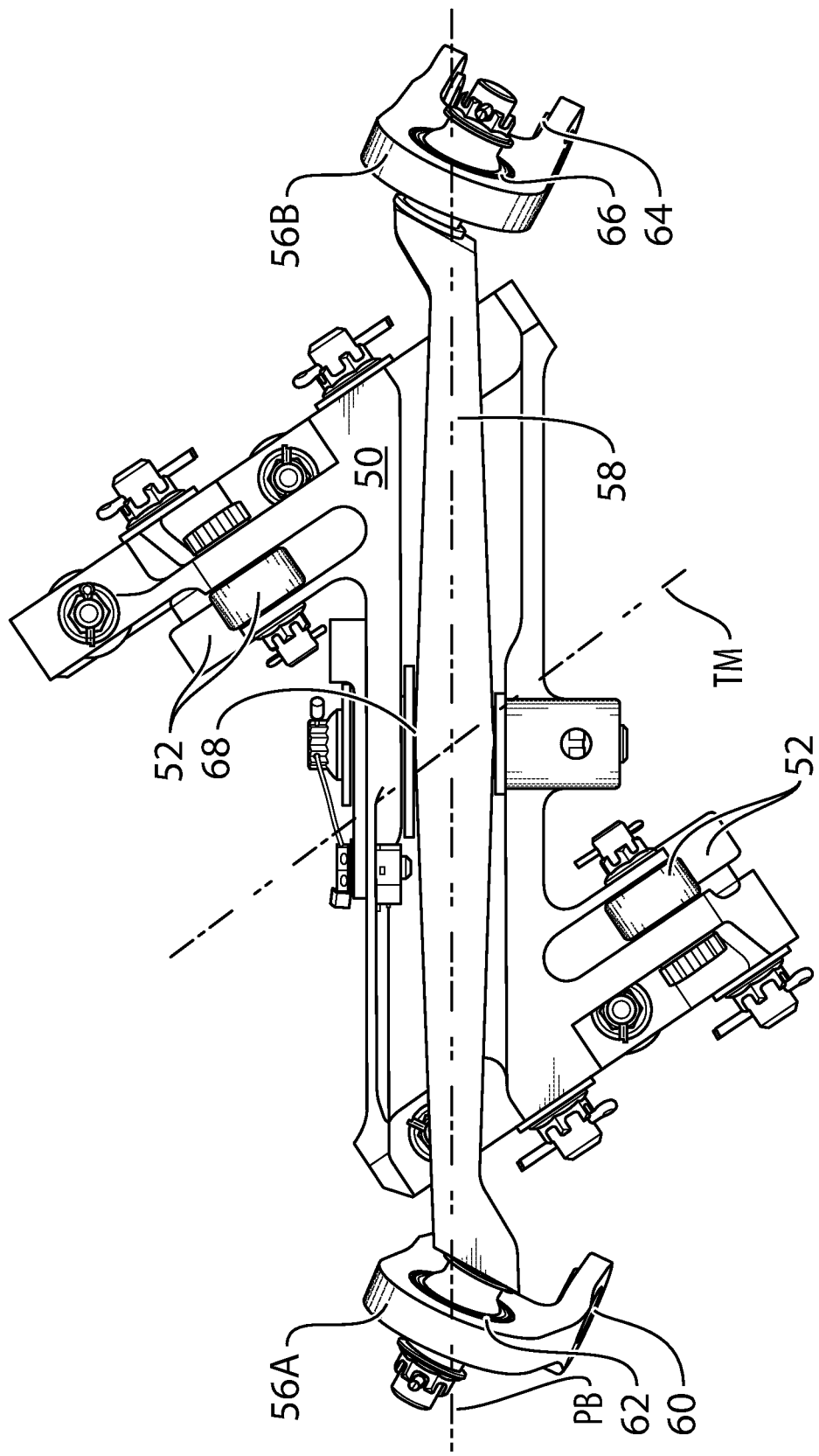

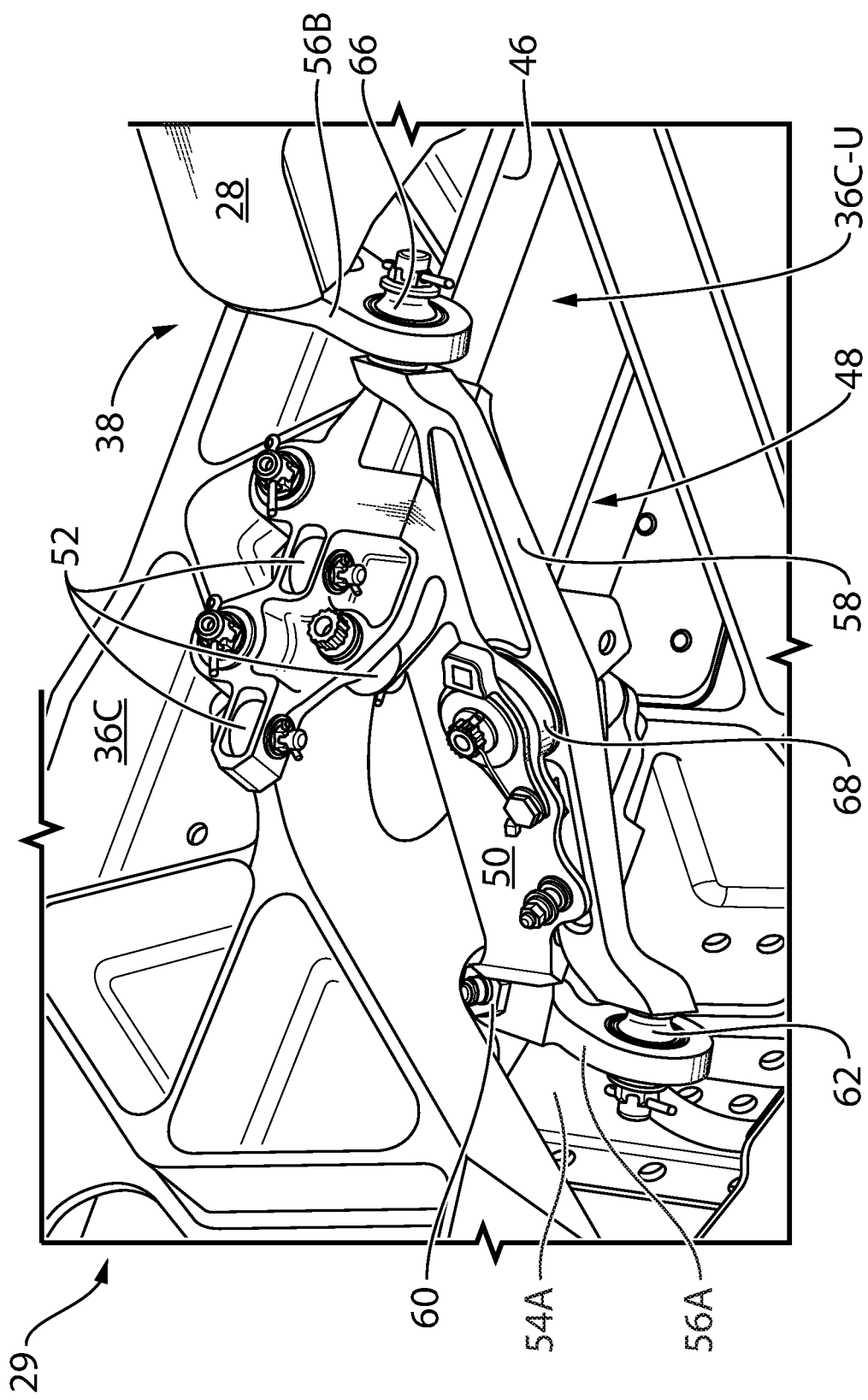

900

```
┌─────────────────────────────────────────────────────────────┐
│ GUIDING AN AFT PORTION OF A TRAILING EDGE FLAP ALONG AN     │
│                 ELONGATED TRACK MEMBER                      │
│                            902                              │
└─────────────────────────────────────────────────────────────┘
                              ↓
┌─────────────────────────────────────────────────────────────┐
│ GUIDING A FORWARD PORTION OF THE TRAILING EDGE FLAP         │
│           ALONG THE ELONGATED TRACK MEMBER                  │
│                            904                              │
└─────────────────────────────────────────────────────────────┘
                              ↓
┌─────────────────────────────────────────────────────────────┐
│ ACCOMODATING TRANSVERSE MOVEMENT OF THE FORWARD             │
│ PORTION OF THE TRAILING EDGE FLAP RELATIVE TO THE           │
│                 ELONGATED TRACK MEMBER                      │
│                            906                              │
└─────────────────────────────────────────────────────────────┘
```

FIG. 9

ASSEMBLIES AND METHODS FOR DEPLOYING A TRAILING EDGE FLAP OF AN AIRCRAFT

CROSS-REFERENCE TO RELATED APPLICATIONS

The present application is a national phase application under 35 U.S.C. 371 of International Patent Application No. PCT/US2017/039557 filed on Jun. 27, 2017, which claims priority on U.S. Provisional Patent Application Ser. No. 62/356,930, entitled "ASSEMBLIES AND METHODS FOR DEPLOYING A TRAILING EDGE FLAP OF AN AIRCRAFT," filed Jun. 30, 2016, the entire content of which is hereby incorporated by reference.

TECHNICAL FIELD

The disclosure relates generally to aircraft high-lift flight control surfaces, and more particularly to deploying trailing edge flaps of aircraft wings.

BACKGROUND OF THE ART

Flaps are a type of deployable high-lift device used to increase the lift of an aircraft wing at a given airspeed and are usually mounted at the trailing edge of a wing of a fixed-wing aircraft. Flaps can typically lower the minimum speed at which the aircraft can be safely flown. Flaps can also cause an increase in drag so they are typically retracted when not needed.

Some known deployment mechanisms for trailing edge flaps have a significant height/thickness and therefore require fairings spaced apart on an underside of a wing in order to house such flap deployment mechanisms. Such fairings disposed on a wing can produce drag which can affect fuel economy and consequently the range of an aircraft.

Improvement is desirable.

SUMMARY

In one aspect, the disclosure describes a trailing edge flap assembly for a wing of an aircraft. The trailing edge flap assembly comprises:

a trailing edge flap movable between a retracted position and a deployed position;

an elongated track member configured to be fixedly secured to a structure of the wing;

an aft coupler movably coupling an aft portion of the trailing edge flap to the elongated track member, the aft coupler guiding the aft portion of the trailing edge flap along the elongated track member as the trailing edge flap moves toward the deployed position; and a forward coupler movably coupling a forward portion of the trailing edge flap to the elongated track member, the forward coupler guiding the forward portion of the trailing edge flap along the elongated track member as the trailing edge flap moves toward the deployed position, the forward coupler accommodating transverse movement of the forward portion of the trailing edge flap relative to the elongated track member.

The forward coupler may accommodate lateral movement of the forward portion of the trailing edge flap relative to the elongated track member.

The elongated track member may be configured to cause the trailing edge flap to undergo Fowler motion.

An aft portion of the elongated track member may deviate toward an outboard direction relative to the wing.

In some embodiments, at least part of the elongated track member extends generally in a streamwise direction relative to the wing.

The elongated track member may define an aft track for guiding the aft coupler and a forward track for guiding the forward coupler where the aft track is separate from the forward track.

The elongated track member may be at least partially embedded into the trailing edge flap.

The forward coupler may comprise a carriage movably coupled to the elongated track member and the forward portion of the flap may be movably coupled to the carriage by an articulated connection.

The forward portion of the flap may be movably coupled to the carriage via a first link and a pivot beam.

The first link may be pivotally coupled to a first coupling point on the trailing edge flap. The first link may be pivotally coupled to the pivot beam. The pivot beam may be pivotally coupled to the carriage.

The assembly may comprise a second link pivotally coupled to a second coupling point on the trailing edge flap, wherein the first coupling point and the second coupling point are disposed on opposite sides of the elongated track member.

The first link may be pivotally coupled to a first end of the pivot beam. The second link may be pivotally coupled to a second end of the pivot beam. An intermediate portion of the pivot beam may be pivotally coupled to the carriage. The intermediate portion may be disposed between the first end and the second end of the pivot beam.

The trailing edge flap may comprise a cut-out for receiving the elongated track member.

The first coupling point and the second coupling point may be disposed on opposite sides of the cut-out.

The pivot beam may be oriented obliquely to the elongated track member.

The carriage may be disposed under the elongated track member.

The forward coupler may accommodate a skewing movement of the trailing edge flap.

The elongated track member may be an inboard elongated track member for guiding movement of an inboard portion of the trailing edge flap. The assembly may comprise an outboard elongated track member configured to be fixedly secured to the structure of the wing for guiding movement of an outboard portion of the trailing edge flap.

The inboard elongated track member and the outboard elongated track member may be configured to cause skewing of the trailing edge flap during deployment of the trailing edge flap.

The trailing edge flap may define at least part of a swept trailing edge of the wing when the trailing edge flap is in the retracted position.

In another aspect, the disclosure describes an aircraft comprising an assembly as disclosed herein.

In another aspect, the disclosure describes a method for deploying a trailing edge flap of an aircraft wing. The method comprises:

guiding an aft portion of the trailing edge flap along an elongated track member as the trailing edge flap moves toward the deployed position;

guiding a forward portion of the trailing edge flap along the elongated track member as the trailing edge flap moves toward the deployed position; and accommodating transverse movement of the forward portion of the trailing edge flap relative to the elongated track member.

The method may comprise accommodating lateral movement of the forward portion of the trailing edge flap relative to the elongated track member.

The method may comprise causing the trailing edge flap to undergo Fowler motion as the trailing edge flap moves toward the deployed position.

The method may comprise guiding the aft portion of trailing edge flap toward an outboard direction relative to the wing.

The method may comprise guiding the trailing edge flap generally toward a streamwise direction.

The track member may be at least partially embedded into the trailing edge flap.

The method may comprise accommodating a skewing movement of the trailing edge flap.

The method may comprise guiding the aft portion of the trailing edge flap along a first track of the elongated track member and guiding the forward portion of the trailing edge flap along a second track of the elongated track member where the first track is separate from the second track.

In another aspect, the disclosure describes a coupler for movably coupling a trailing edge flap of an aircraft wing to an elongated track member. The coupler comprises:

a carriage configured to be movably coupled to the elongated track member for movement along the elongated track member; and an articulated link coupled to the carriage and configured to be coupled to a portion of the trailing edge flap, the articulated link accommodating transverse movement of the portion of the trailing edge flap relative to the elongated track member.

The articulated link may be configured to accommodate lateral movement of the portion of the trailing edge flap relative to the elongated track member.

The articulated link may be coupled to the carriage via a pivot beam.

The articulated link may be configured to be pivotally coupled to a first coupling point on the trailing edge flap. The articulated link may be pivotally coupled to the pivot beam. The pivot beam may be pivotally coupled to the carriage.

The articulated link may be coupled to the pivot beam via a spherical bearing.

The pivot beam may be coupled to the carriage via a spherical bearing.

The articulated link may be a first articulated link and the coupler may comprise a second articulated link configured to be pivotally coupled to a second coupling point on the trailing edge flap where the first coupling point and the second coupling point are disposed on opposite sides of the elongated track member.

The first articulated link may be pivotally coupled to a first end of the pivot beam. The second articulated link may be pivotally coupled to a second end of the pivot beam. An intermediate portion of the pivot beam may be pivotally coupled to the carriage. The intermediate portion may be disposed between the first end and the second end of the pivot beam.

The pivot beam may be configured to be oriented obliquely to the elongated track member.

The carriage may be configured to be disposed under the elongated track member when movably coupled to the elongated track member.

The articulated link may be configured to accommodate a skewing movement of the trailing edge flap.

In a further aspect, the disclosure describes an aircraft comprising a coupler as disclosed herein.

Further details of these and other aspects of the subject matter of this application will be apparent from the drawings and detailed description included below.

DESCRIPTION OF THE DRAWINGS

Reference is now made to the accompanying drawings, in which:

FIG. 5C is a bottom view of the forward coupler of FIG. 5A;

FIG. 6 is a perspective view of the forward coupler of FIG. 5A movably coupled to the track member of FIG. 3B;

FIG. 8A shows a configuration where the outboard flap is retracted and FIG. 8B shows a configuration where the outboard flap is deployed; and FIG. 9 is a flowchart illustrating an exemplary method for deploying a trailing edge flap of an aircraft wing.

DETAILED DESCRIPTION

The present disclosure relates to high-lift devices such as trailing edge flaps and also to assemblies, couplers and methods for guiding the movement of such trailing edge flaps. In some embodiments, the trailing edge flap assemblies disclosed herein may be of relatively small height (i.e., low profile) so that relatively large drag-producing fairings on the underside of aircraft wings may not be required. For example, in some embodiments and depending on the specific installation, the trailing edge flap assemblies disclosed herein may require one or more relatively smaller fairings producing relatively less drag than larger fairings. Accordingly, in some embodiments, the trailing edge flap assemblies and methods disclosed herein may contribute toward a more efficient aircraft wing of reduced drag and toward improved fuel economy and range of an aircraft.

In some embodiments, the trailing edge flap assemblies disclosed herein may comprise a coupler for movably coupling a trailing edge flap to an elongated track member which is at least partially embedded into the trailing edge flap in order to reduce the overall height of the trailing edge flap assembly. In some embodiments, the coupler may be configured to accommodate transverse (e.g., lateral) movement and/or skewing movement of the trailing edge flap relative to the elongated track member in order to accommodate more complex movement of the trailing edge flap to achieve a desired aerodynamic performance.

Aspects of various embodiments are described through reference to the drawings.

Figure 1:
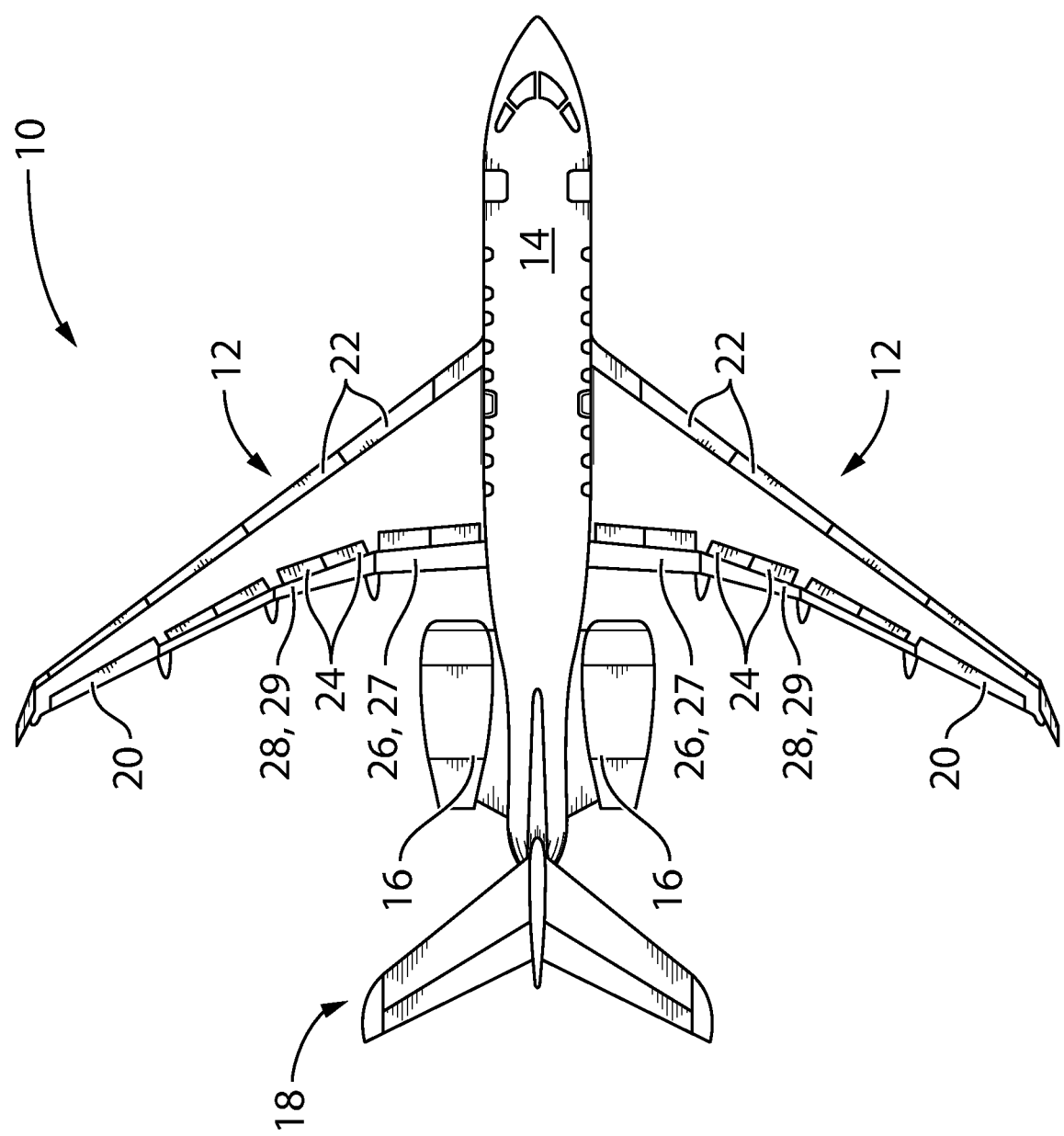
FIG. 1 is a top plan view of an exemplary aircraft comprising a trailing edge flap assembly as disclosed herein.

FIG. 1 is a top plan view of an exemplary aircraft 10 which may comprise a trailing edge flap assembly as disclosed herein. Aircraft 10 may be any type of aircraft such as corporate (e.g., business jet), private, commercial and passenger aircraft. For example, aircraft 10 may be a narrow-body, twin-engine jet airliner. Aircraft 10 may be a fixed-wing aircraft. Aircraft 10 may comprise one or more wings 12, fuselage 14, one or more engines 16 and empennage 18 of known or other type. One or more of engines 16 may be mounted to fuselage 14. Alternatively, or in addition, one or more of engines 16 may be mounted to wings 12 or otherwise mounted to aircraft 10. Wings 12 may each include one or more flight control surfaces such as aileron(s) 20, leading edge slat(s) 22, spoiler(s) 24 and trailing edge flap(s) 26, 28. Leading edge slats 22 and trailing edge flaps 26, 28 may be considered "high-lift" flight control surfaces that may be deployed to increase the amount of lift generated by wings 12 during landing, take-off and/or during any other appropriate phases of flight or conditions requiring increased lift. One or more trailing edge flaps 26, 28 may be disposed at or near a trailing edge of each wing 12 and may define at least a portion of a trailing edge of each wing 12.

Inboard trailing edge flaps 26 may be disposed inboard of outboard trailing edge flaps 28 in relation to wing 12 and are referred hereinafter in the singular as "inboard flap 26". In some embodiments, inboard flap 26 may be disposed in an inboard section of wing 12 also known as a "Yehudi" section of wing 12. Outboard trailing edge flaps 28 may be disposed outboard of inboard trailing edge flaps 26 and are referred hereinafter in the singular as "outboard flap 28". References made herein to "inboard" and "outboard" are made in to indicate relative positioning along the span of wings 12 with respect to fuselage 14 where "inboard" is understood to mean toward a root of wing 12 and "outboard" is understood to mean toward a tip of wing 12.

A trailing edge of wing 12 may have a varying sweep angle along the span of wing 12 relative to a longitudinal axis of fuselage 14. For example, outboard flap 28 may define at least part of a swept trailing edge of wing 12 when outboard flap 28 is in the retracted position. For example, an inboard trailing edge portion of wing 12 defined by inboard flap 26 may be less swept than an outboard trailing edge portion of wing 12 defined by outboard flap 28. Accordingly, the trailing edge portion of wing 12 defined by inboard flap 26 may be non-parallel to the trailing edge portion of wing 12 defined by outboard flap 28. Inboard flap 26 may be part of an inboard flap assembly 27 and outboard flap 28 may be part of an outboard flap assembly 29. In some embodiments, inboard flap 26 may be a double-slotted flap of known or other type and outboard flap 28 may be a single-slotted flap of known or other type.

The term "adjacent" as used herein in relation to the relationship between inboard flap 26 and outboard flap 28 is intended to encompass a proximal relative positioning of inboard flap 26 and outboard flap 28 such that, even though they may not contact each other, they are disposed immediately next to each other without any intermediate spacer(s) or other fixed surface(s) disposed between them.

Figure 2A:
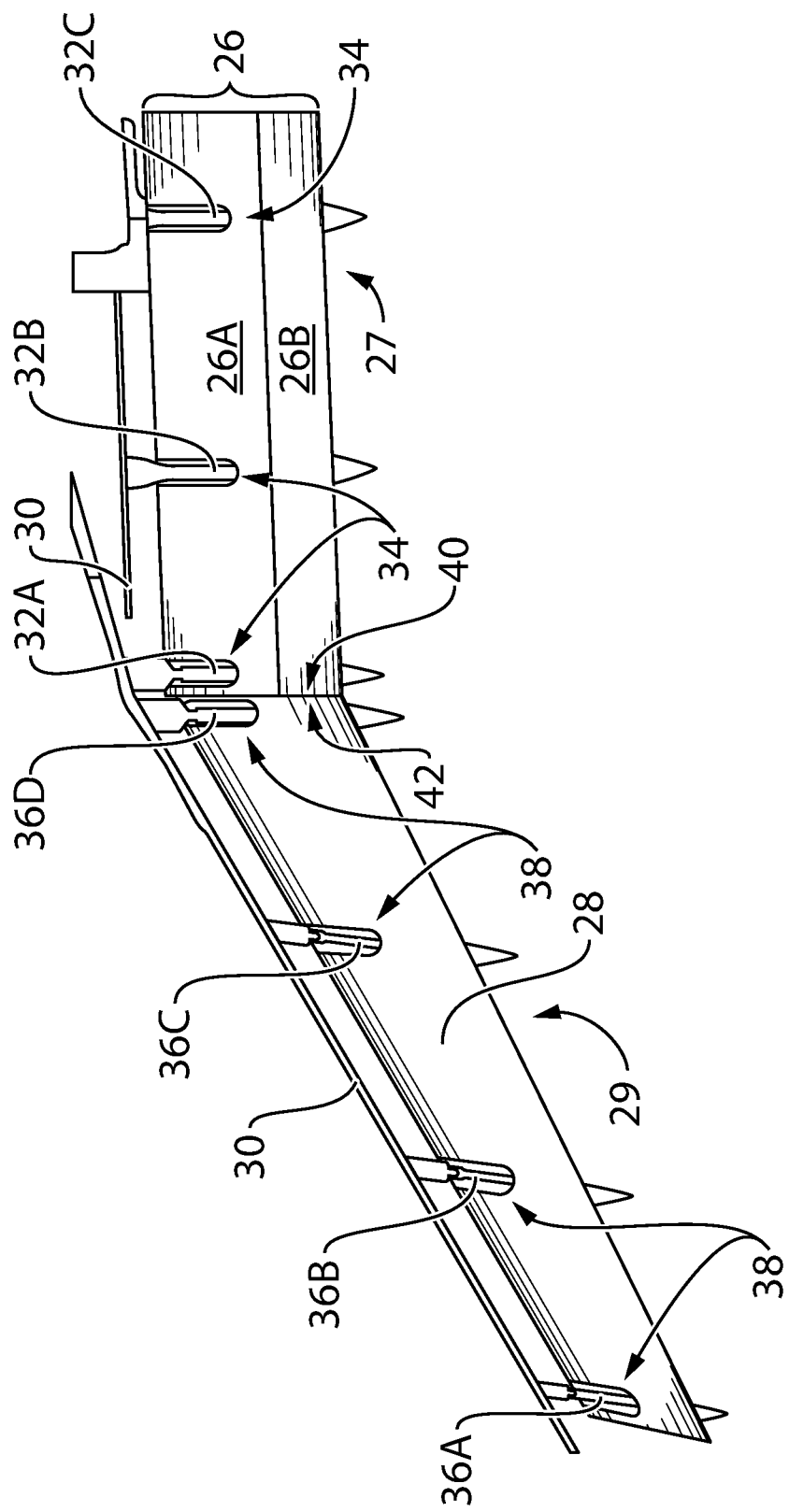
FIG. 2A is a top plan view of exemplary inboard flap and outboard flap of the aircraft of FIG. 1, in a retracted position.
Figure 2B:
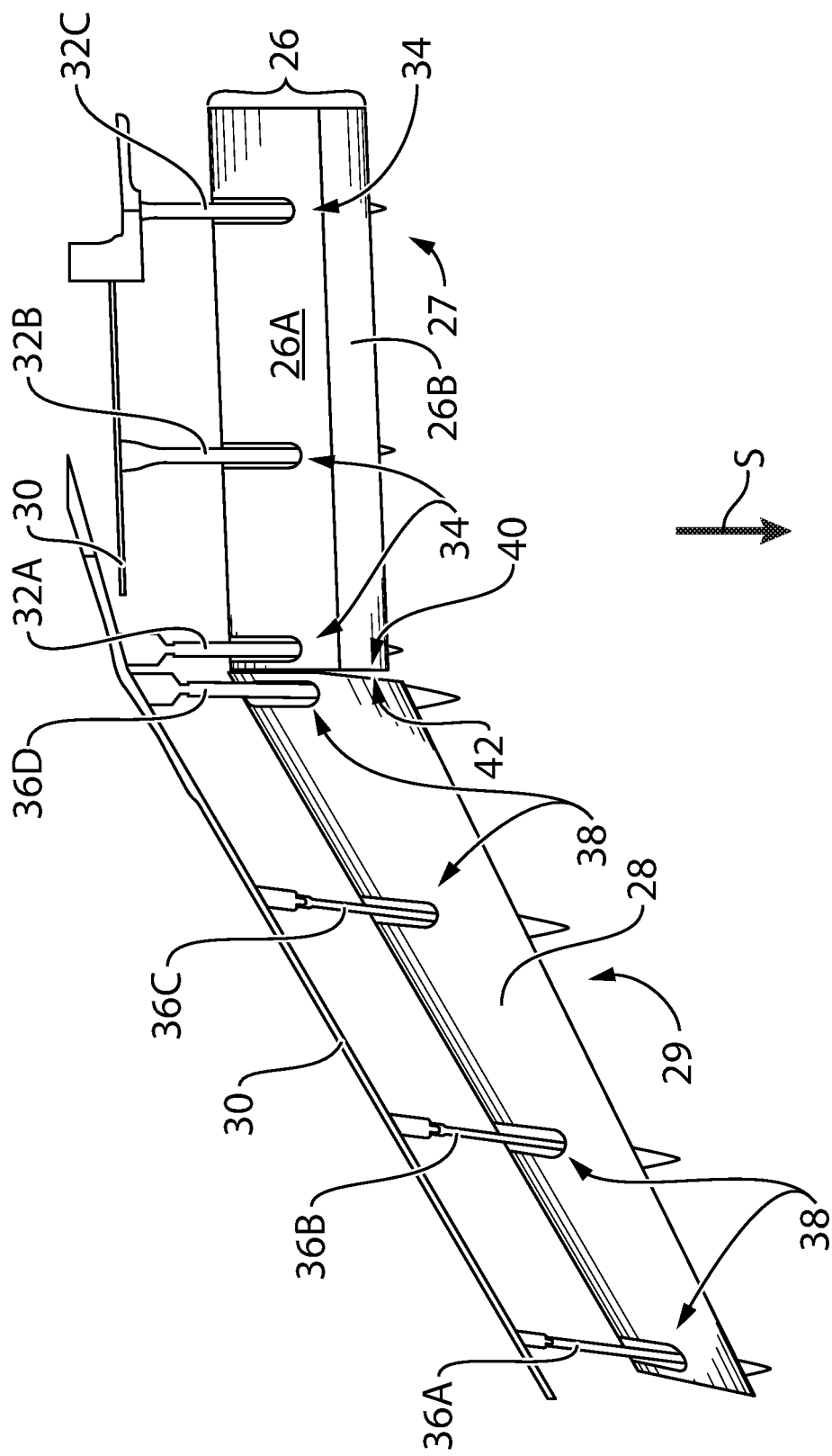
FIG. 2B is a top plan view of the inboard flap and the outboard flap of FIG. 2A, in a deployed position.

FIG. 2A is a top plan view of inboard flap 26 and outboard flap 28 of aircraft 10 in a retracted position and FIG. 2B is a top plan view of inboard flap 26 and outboard flap 28 in a deployed position. In reference to FIG. 2A, inboard flap 26 and outboard flap 28 may each be movably coupled to one or more structural elements 30 of wing 12. Structural element(s) 30 may, for example, comprise a spar of wing 12 or any other suitable structure.

Inboard flap 26 may be movably coupled to structural element 30 via one or more elongated track members 32A-32C and associated couplers (not shown in FIGS. 2A and 2B) of known or other types. Inboard flap 26 may be actuated by one or more actuators of known or other types. Track members 32A-32C may guide the deployment and retraction of inboard flap 26. Track members 32A-32C may be considered part of inboard flap assembly 27. Track members 32A-32C may be at least partially embedded in inboard flap 26 so that at least part of track members 32A-32C may be received into inboard flap 26 via cut-outs 34 formed in inboard flap 26 so that an overall height/thickness of inboard flap assembly 27 may be reduced. Track members 32A-32C may be fixedly secured to structural element 30 according to known or other methods.

Similarly, outboard flap 28 may be movably coupled to structural element 30 via one or more elongated track members 36A-36D and associated couplers (not shown) of known or other types. Outboard flap 28 may be actuated by one or more actuators of known or other types. Track members 36A-36D may guide the deployment and retraction of outboard flap 28. Track members 36A-36D may be considered part of outboard flap assembly 29. Track members 36A-36D may be at least partially embedded in outboard flap 28 so that at least part of track members 36A-36D may be received into outboard flap 28 via cut-outs 38 formed in outboard flap 28 so that an overall height/thickness of outboard flap assembly 29 may also be reduced. Track members 36A-36D may be fixedly secured to structural element 30 according to known or other methods.

Outboard flap 28 may be adjacent inboard flap 26 so that no intermediate (e.g., pie-shaped) spacer or other fixed surface(s) may be disposed between outboard flap 28 and inboard flap 26. Even though outboard flap 28 and inboard flap 26 may be adjacent, they may not necessarily contact each other when they are retracted, deployed or during deployment or retraction. For example, a relatively narrow gap may be disposed between outboard flap 28 and inboard flap 26 to permit actuation of outboard flap 28 and inboard flap 26 without interference with each other. For example, in some embodiments, outboard edge 40 of inboard flap 26 and inboard edge 42 of outboard flap 28 may be substantially parallel when outboard flap 28 and inboard flap 26 are substantially retracted as viewed from a top view of wing 12 as shown in FIG. 2A.

In reference to FIG. 2B, inboard flap 26 and outboard flap 28 may be configured for generally streamwise deployment relative to aircraft wing 12 as illustrated by arrow "S". Arrow S may, in some embodiments, be generally parallel to a longitudinal axis of fuselage 14 of the aircraft 10. For example, track members 32A-32C (i.e., vertical projections thereof) may be oriented (e.g., generally parallel to arrow S) to permit streamwise deployment of inboard flap 26. Similarly, track members 36A-36D (i.e., vertical projections thereof) may be oriented (e.g., generally parallel to arrow S) to permit streamwise deployment of outboard flap 28. Accordingly, track members 36A-36D may be non-parallel to structural member 30, which may be a spar of wing 12. In some embodiments, outboard flap assembly 29 may be configured to cause outboard flap 28 to be deployed to avoid colliding with inboard flap 26 while maintaining acceptable spanwise flap continuity (e.g., substantially sealed interface)

between (e.g., unswept) inboard flap 26 and (e.g., swept) outboard flap 28 when inboard flap 26 and outboard flap 28 are deployed.

Double-slotted inboard flap 26 may comprise first panel 26A and second panel 26B movable relative to first panel 26A. First panel 26A may comprise a forward panel of double-slotted flap 26 and second panel 26B may comprise an aft panel of double-slotted flap 26. In some embodiments, first panel 26A may define a larger surface area for interacting with the air than second panel 26B. For example, first panel 26A may have a longer chord length than second panel 26B in some embodiments. Alternatively, in some embodiments, first panel 26A may define a smaller surface area for interacting with the air than second panel 26B.

Figure 3B:
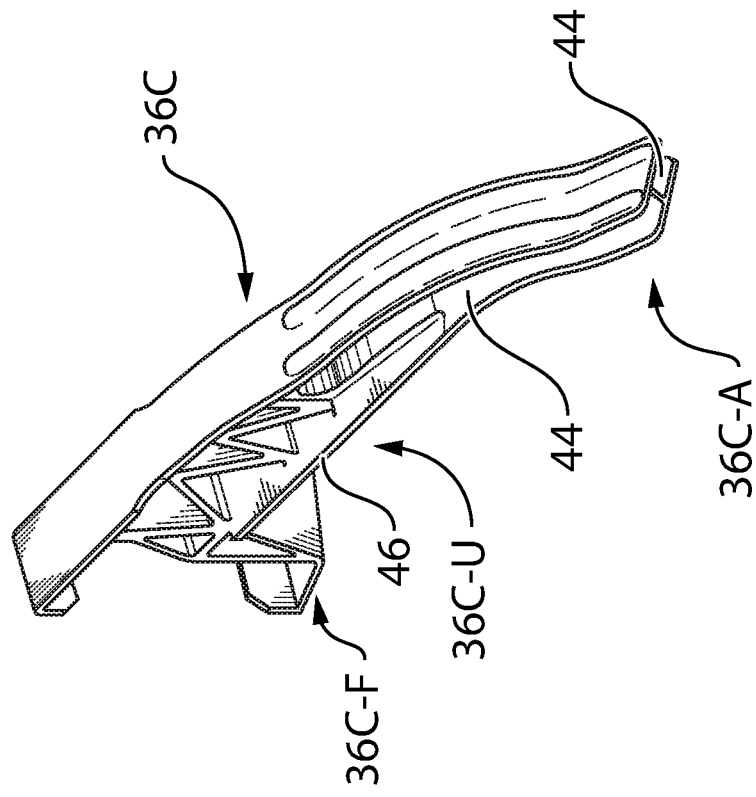
FIGS. 3A and 3B are perspective views of exemplary elongated track members for guiding the movement of the outboard flap of FIG. 2A.
Figure 3A:
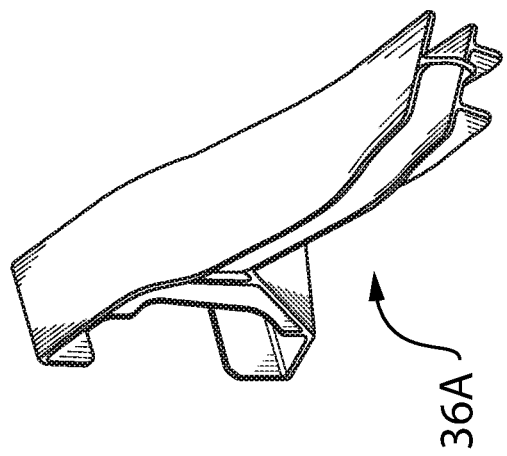

FIG. 3A is a perspective view of elongated track member 36A (also shown in FIGS. 2A and 2B) and FIG. 3B is a perspective view of elongated track member 36C (also shown in FIGS. 2A and 2B), both of which being part of trailing edge flap assembly 29 comprising outboard flap 28. As shown in FIGS. 2A and 2B, track member 36C may be disposed inboard of track member 36A. Accordingly, track member 36A may be positioned and configured to guide movement of an outboard portion of outboard flap 28 and track member 36C may be positioned and configured to guide movement of an inboard portion of outboard flap 28.

As illustrated, track members 36A, 36C may have different lengths, shapes and/or configurations. Accordingly, the movement of an outboard portion of outboard flap 28 and of an inboard portion of outboard flap 28 as respectively guided by track member 36A and track member 36C may be different as outboard flap 28 is deployed. This may cause, the movement of outboard flap 28 to be skewed where, for example, a displacement of the inboard portion of outboard flap 28 may be greater than a displacement of the outboard portion of outboard flap 28. In some embodiments, the respective types of movements of the inboard portion of outboard flap 28 and of the outboard portion of outboard flap 28 may be different. In some embodiments, the movement of outboard flap 28 may be conical where, for example, a radius of rotation of the inboard portion of outboard flap 28 during part of its deployment may be greater than a radius of rotation of the outboard portion of outboard flap 28. In some embodiments, track member 36A and track member 36C may be configured to cause twisting of outboard flap 28 as it is deployed. The track members 36A, 36C are shown as examples only and it is understood that outboard flap 28 may be movably coupled to structural element 30 via additional track members (e.g., 36B, 36D) according to known or other methods.

In some embodiments, one or more of track members 36A-36D may be configured to cause outboard flap 28 or part thereof to undergo Fowler motion so as to increase the area of wing 12 and also change the camber of the wing 12. For example, the movement of outboard flap 28 or (e.g., an inboard) part thereof may comprise sliding aft before hinging downwardly thereby first increasing the chord of wing 12 and then the camber. For example, aft portion 36C-A of track member 36C may be hooked downwardly to accomplish a major part of the rotation of outboard flap 28 for the landing configuration.

In some embodiments, track member 36C may comprise one or more aft tracks 44 disposed on opposite lateral sides of track member 36C and cooperatively defining an aft guide path for guiding an aft coupler (described below). In some embodiments, track member 36C may comprise one or more forward tracks 46 disposed on opposite lateral sides of track member 36C cooperatively defining a forward guide path for guiding a forward coupler (described below). Aft tracks 44 and forward tracks 46 may define separate and different respective guide paths. Track member 36C may also comprise forward portion 36C-F and underside 36C-U.

In some embodiments, aft portion 36C-A of track member 36C may deviate toward an outboard direction relative to wing 12 so that a guide path defined by aft tracks 44 may also deviate toward an outboard direction. This outboard deviation of track member 36C may contribute to the skewing movement of outboard flap 28 during its deployment in order to achieve the desired aerodynamic performance. Alternatively, in some embodiments and depending on the configuration (e.g., sweep) of wing 12, aft portion 36C-A of track member 36C may deviate toward an inboard direction relative to wing 12 so that the guide path defined by aft tracks 44 may also deviate toward an inboard direction. Accordingly, aft tracks 44 may be curvilinear so that they may, for example, deviate in a spanwise direction relative to wing 12.

In some embodiments, aft portion 36C-A of track member 36C may be twisted so that opposite aft tracks 44 may extend along track member 36C in a quasi-helical manner. The twisted shape of the aft portion 36C-A may cause a twisting movement of outboard flap 28 during its deployment in order to achieve the desired aerodynamic performance.

Figure 4:
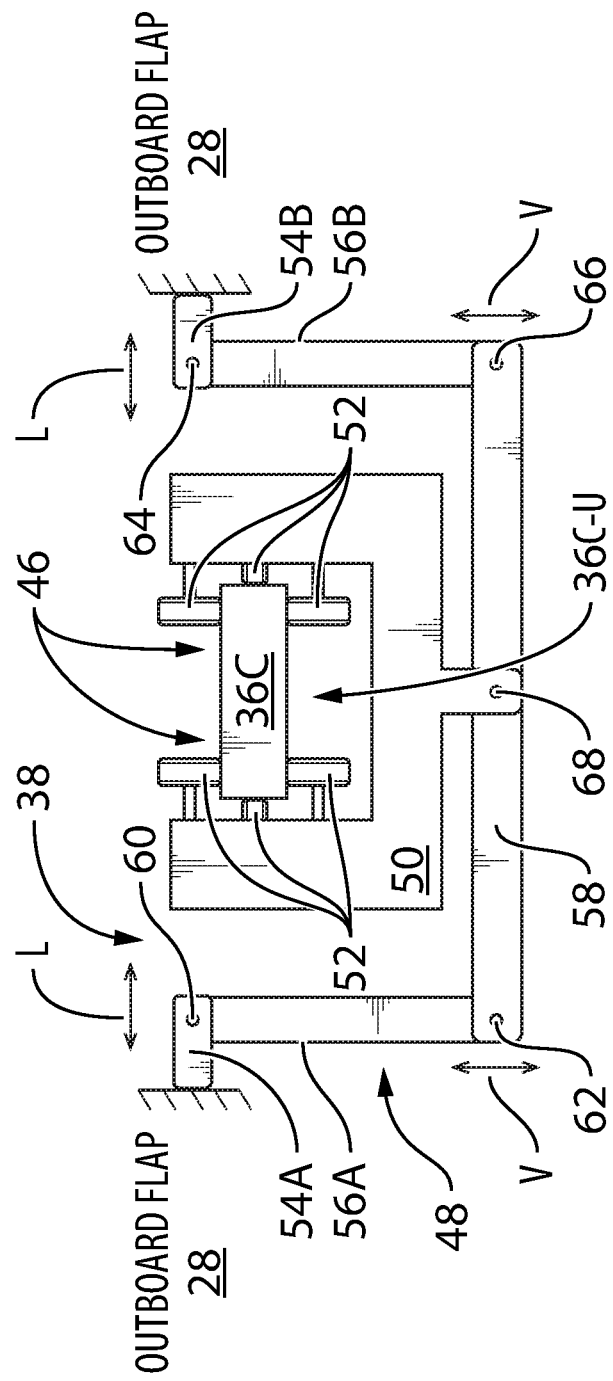
FIG. 4 is a schematic representation of an exemplary forward coupler for movably coupling the outboard flap of FIG. 2A to the track member of FIG. 3B.

FIG. 4 is a schematic representation of an exemplary coupler 48 for movably coupling outboard flap 28 to track member 36C and for guiding the movement of outboard flap 28 along track member 36C during the deployment and/or retraction of outboard flap 28. In some embodiments, coupler 48 may be considered a forward coupler serving to movably couple a forward portion of outboard flap 28 to track member 36C. For example, forward coupler 48 may be configured to guide the forward portion of outboard flap 28 along forward tracks 46 of track member 36C as outboard flap 28 moves toward the deployed position. In various embodiments, forward coupler 48 may comprises carriage 50 movably coupled to track member 36C via, for example, one or more rollers 52. Rollers 52 may comprise one or more vertical guide rollers and one or more lateral guide rollers to constrain the movement of carriage 50 along aft tracks 46 defined by track member 36C. In some embodiments, forward tracks 46 may comprise laterally-extending opposite flanges of track member 36C.

As explained below, forward coupler 48 may be configured to guide the movement of a portion of outboard flap 28 in one degree-of-freedom defined by forward tracks 46 and may be further configured to accommodate movement of outboard flap 28 in one or more additional degrees-of-freedom. Such one or more additional degrees-of-freedom may, for example, comprise transverse movement such as lateral movement (see arrows "L" in FIG. 4), vertical movement (see arrows "V" in FIG. 4) and/or skewing movement of the (e.g., forward) portion of outboard flap 28 coupled to forward coupler 48 relative to track member 36C. In some embodiments, forward coupler 48 may be configured to accommodate both transverse movement and skewing movement of (e.g., a forward portion of) outboard flap 28 relative to track member 36C. Lateral movement may be sideways movement relative to a portion of elongated track member 36C and/or of aft track(s) 46 at or near a position of carriage 50. For example, such lateral movement may be along a spanwise direction or along a sweep direction of wing 12. The transverse movement may not necessarily be purely perpendicular to track member 36C. For example, transverse movement may comprise a translation movement where only a vector component of such movement is transverse to track member 36C. The transverse movement of the forward portion of outboard flap 28 may be caused by the skewed movement of outboard flap 28.

In the present disclosure, it is understood that the transverse movement that forward coupler 48 accommodates is intended to represent movement amounts that are greater than a play tolerance that may be afforded by a transversely rigid coupling. Accordingly, forward coupler 48 may be considered to be transversely flexible and capable of taking up such amount of transverse movement without causing structural damage. The amount of transverse movement that is accommodated by forward coupler 48 may depend on the size and specific configuration of outboard flap assembly 29. For example, in some embodiments, the accommodated transverse movement may be greater than about 0.25 inch (6 mm). In some embodiments, the accommodated transverse movement may be greater than about 0.5 inch (13 mm). In some embodiments, the accommodated transverse movement may be greater than about 1 inch (25 mm). In some embodiments, the accommodated transverse movement may be about 1.2 inch (30 mm). In some embodiments, the accommodated transverse movement may be between about 1 inch (25 mm) and about 2 inches (51 mm). In some embodiments, the accommodated transverse movement may be between about 0.25 inch (6 mm) and about 3 inches (76 mm).

In some embodiments, track member 36C may be at least partially embedded into outboard flap 28 so that track member 36C may extend into cut-out 38 formed into outboard flap 28. In some embodiments, carriage 50 may be generally disposed under (e.g., facing an underside 36C-U) of track member 36C for the sake of compactness.

In various embodiments, a forward portion of outboard flap 28 may be movably coupled to carriage 50 via one or more articulated connections to accommodate transverse movement of outboard flap 28 relative to track member 36C and/or to accommodate skewing movement of outboard flap 28 relative to track member 36C. In some embodiments, outboard flap 28 may be movably coupled to carriage 50 at two coupling locations 54A, 54B. In some embodiments, coupling locations 54A, 54B may be disposed on opposite sides of track member 36C. In some embodiments, coupling locations 54A, 54B may be disposed on opposite sides of cut-out 38.

In some embodiments, the articulated connection(s) between outboard flap 28 and carriage 50 may comprise links 56A, 56B and pivot beam 58. For example, a first end of link 56A may be pivotally coupled to coupling location 54A of outboard flap 28 at pivot point 60 and a second end of link 56A may be pivotally coupled to a first end of pivot beam 58 at pivot point 62. Similarly, a first end of link 56B may be pivotally coupled to coupling location 54B of outboard flap 28 at pivot point 64 and a second end of link 56B may be pivotally coupled to a second end (opposite the first end) of pivot beam 58 at pivot point 66.

In some embodiments, pivot beam 58 may extend across and beyond a width of track member 36C. An intermediate portion of pivot beam 58 may be pivotally coupled to carriage 50 at pivot point 68. Pivot point 68 may be disposed between pivot point 62 and pivot point 66. In some embodiments, pivot point 68 may be disposed at a midpoint along the length (i.e., between opposite ends) of pivot beam 58. In various embodiments, one or more of the connections at pivot points 60, 62, 64, 66 and 68 may comprise simple pivot connections, self-aligning connections (e.g., spherical bearings) or other type(s) of connections suitable to accommodate the desired motion in one or more different degrees-of-freedom.

Figure 5A:
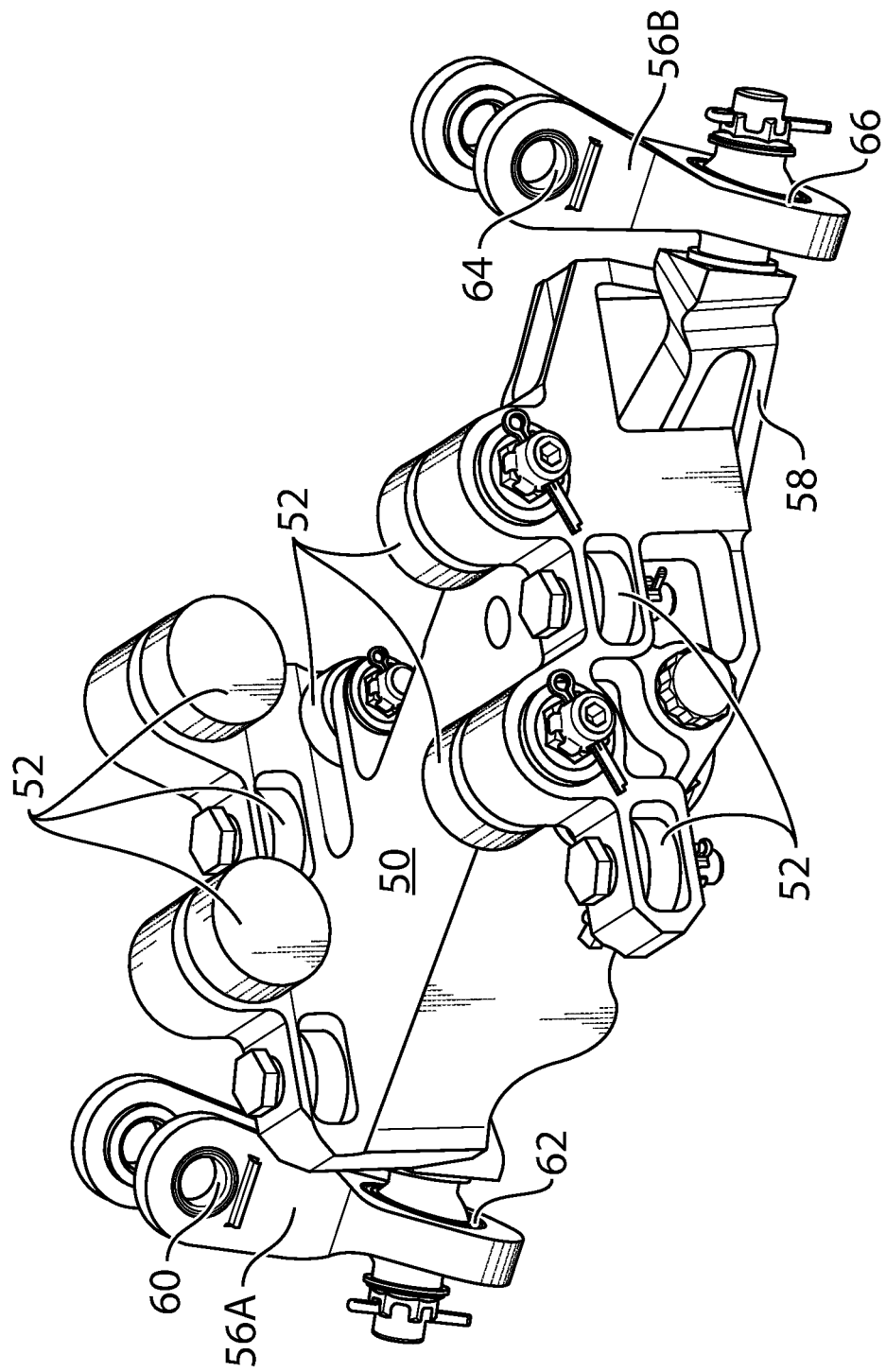
FIG. 5A is a perspective view of an exemplary embodiment of the forward coupler of FIG. 4.
Figure 5B:
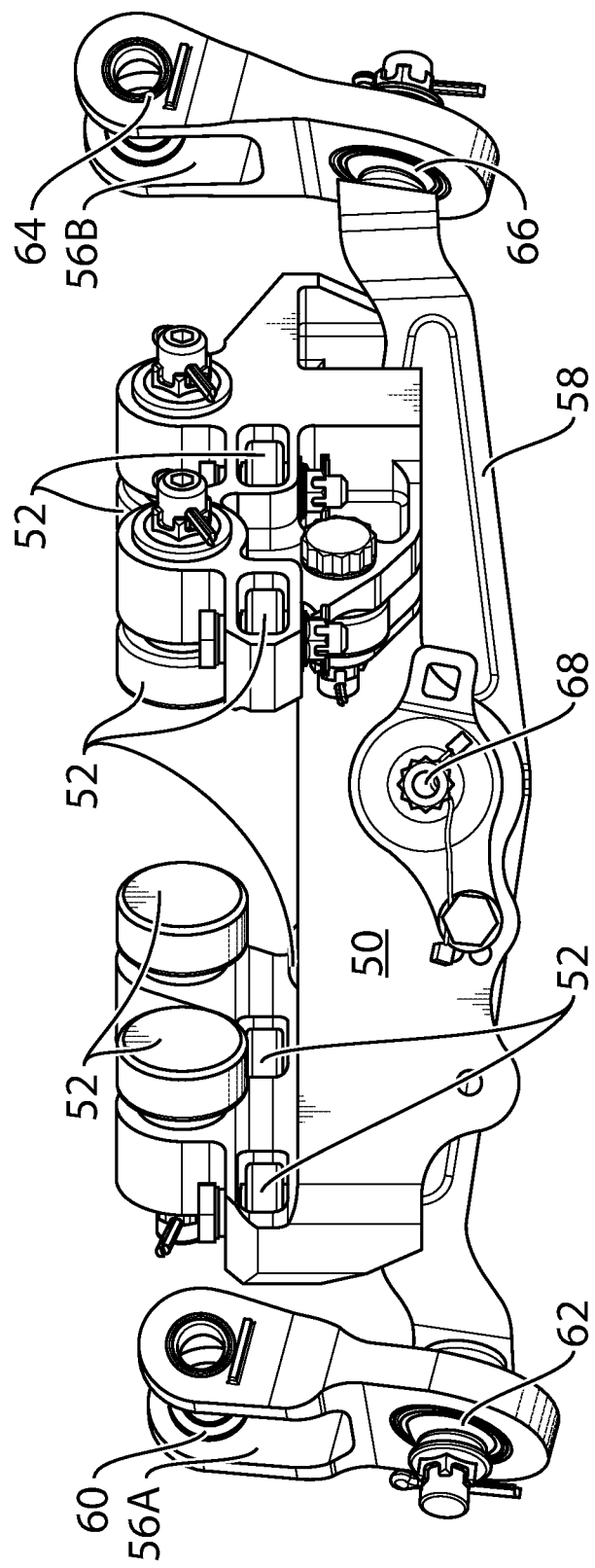
FIG. 5B is a front view of the forward coupler of FIG. 5A.

FIG. 5A is a perspective view of an exemplary embodiment of forward coupler 48 in accordance with the schematic representation shown in FIG. 4. FIG. 5B is a front view of the exemplary embodiment of forward coupler 48 shown in FIG. 5A. FIG. 5C is a bottom view of the exemplary embodiment of forward coupler 48 shown in FIG. 5A.

FIG. 5C shows that pivot beam 58 may be oriented obliquely to elongated track member 36C. A general orientation of track member 36C is illustrated by line TM and a general orientation of pivot beam 58 is illustrated by line PB in FIG. 5C. In some embodiments, line TM may extend generally along the streamwise direction represented by arrow S in FIG. 2B. In some embodiments, the orientation of pivot beam 58 (line PB) may be generally parallel to a leading edge of outboard flap 28 as viewed from the top as shown in FIG. 2B. Pivot beam 58 may be oriented differently for different configurations of outboard flap 28. For example, the orientation (e.g., line PB) of pivot beam 58 may be selected to accommodate the positions of coupling locations 54A, 54B available on outboard flap 28.

FIG. 6 is a perspective view of the exemplary forward coupler 48 of FIG. 5A movably coupled to track member 36C of FIG. 3A as part of flap assembly 29. Carriage 50 may be movably coupled to track 46 via one or more guide rollers 52. Carriage 50 may be generally disposed under (e.g., facing an underside 36C-U) of track member 36C.

Figure 7:
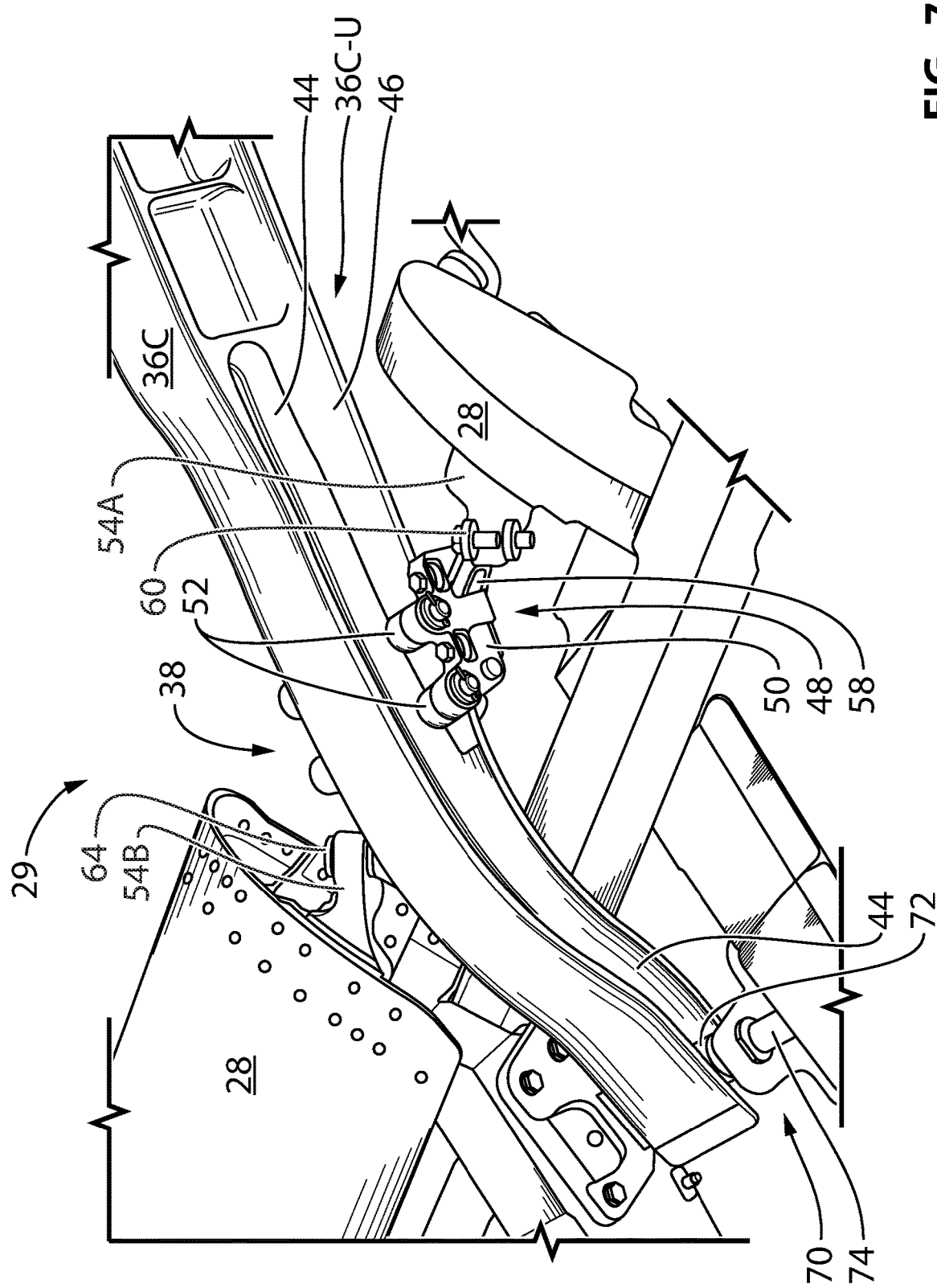
FIG. 7 is a perspective view of the forward coupler of FIG. 5A movably coupling a forward portion of the outboard flap of FIG. 2A to the track member of FIG. 3B together with an exemplary aft coupler movably coupling an aft portion of the outboard flap to the track member.

FIG. 7 is a perspective view of the exemplary forward coupler 48 of FIG. 5A movably coupling a forward portion of outboard flap 28 to track member 36C together with an exemplary aft coupler 70 movably coupling an aft portion of outboard flap 28 to track member 36C. FIG. 7 shows a configuration of part of outboard flap assembly 29 where outboard flap 28 is deployed. Forward coupler 48 may serve to guide the movement of the forward portion of outboard flap 28 along forward tracks 46 and aft coupler 70 may serve to guide the movement of the aft portion of outboard flap 28 along aft tracks 44. References made herein to "aft" and "forward" portions of outboard flap 28 are used to represent relative locations on outboard flap 28 and are not intended to be limited to absolute aft or forward portions of outboard flap 28.

Aft coupler 70 may be of known or other type. In some embodiments, aft coupler 70 may comprise one or more guide rollers 72 rotatably attached to outboard flap 28 via axle(s) 74. For example, aft coupler 70 may comprise one guide roller 72 disposed on each side of track member 36C for respectively engaging each aft track 44 disposed on opposite lateral sides of track member 36C. It is understood that guide roller 72 and associated axle 74 disposed on the side of track member 36C not visible in FIG. 7 may be substantially identical to roller 72 and axle 74 that are visible in FIG. 7. In some embodiments, aft coupler 70 may not comprise a carriage and may not necessarily accommodate movement in the same degree(s)-of-freedom as forward coupler 48. Accordingly, the movement of aft coupler 70 along aft track(s) 44 may be a cause for the transverse and/or skewing movement of the forward portion of outboard flap 28 that is accommodated by forward coupler 48.

Figure 8A:
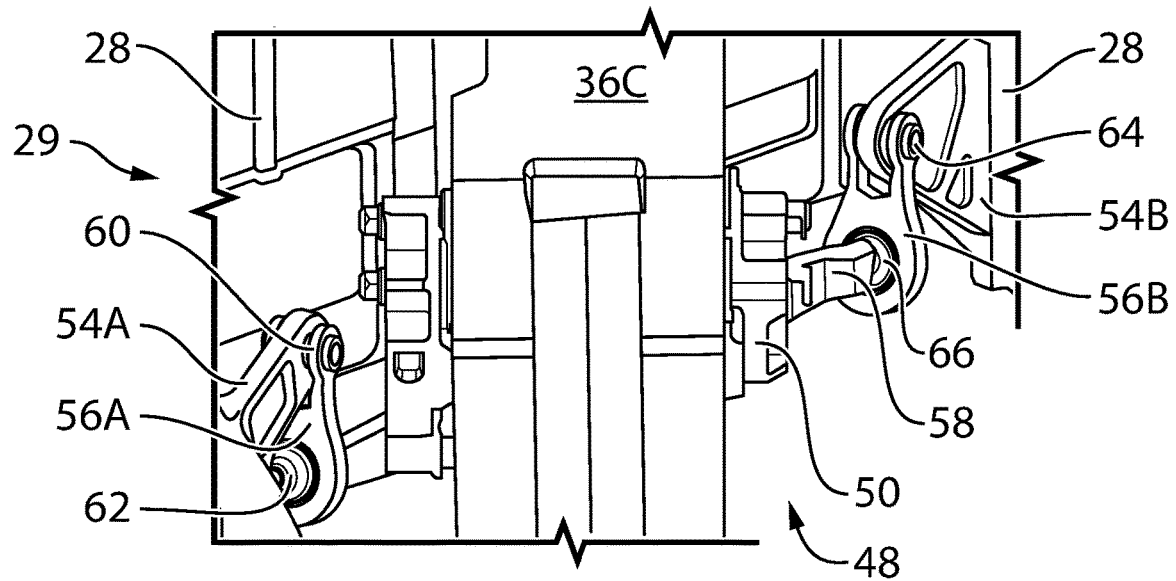
FIGS. 8A and 8B are perspective views of an exemplary outboard flap assembly comprising the forward coupler of FIG. 5A where
Figure 8B:
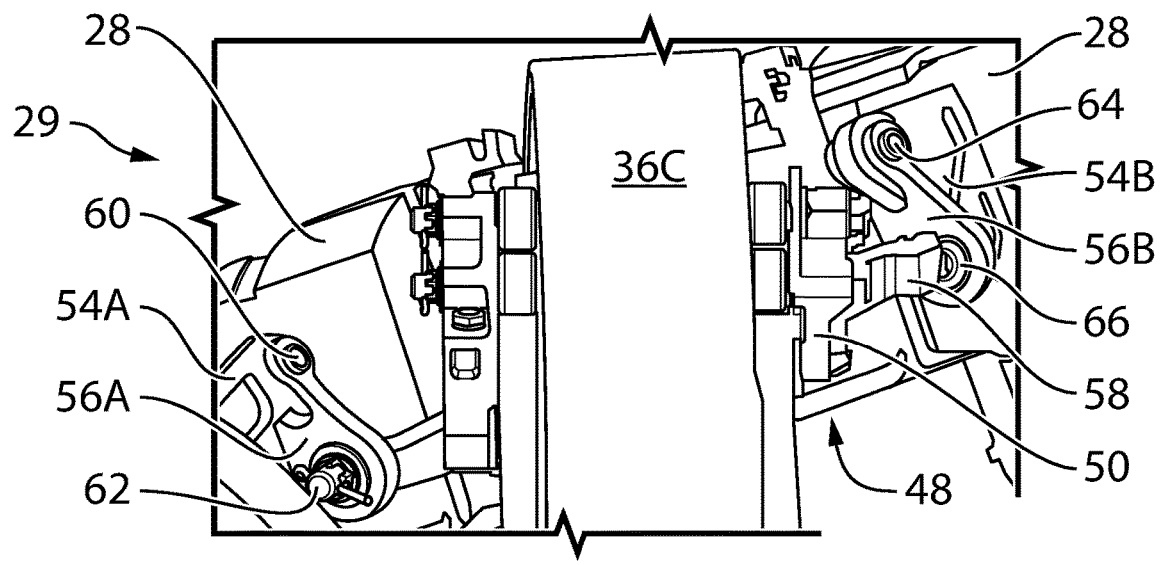

FIGS. 8A and 8B are perspective views of outboard flap assembly 29 viewed toward an aft direction along track member 36C where FIG. 8A shows a configuration where outboard flap 28 is retracted and FIG. 8B shows a configuration where outboard flap 28 is deployed. The transverse movement of the forward portion of outboard flap 28 relative to track member 36C that occurs during the deployment of outboard flap 28 is accommodated by forward coupler 48 as shown by the change in orientation of links 56A, 56B between FIG. 8A and FIG. 8B.

FIG. 9 is a flowchart illustrating an exemplary method 900 for deploying outboard flap 28 of wing 12 of aircraft 10. Method 900 or part(s) thereof may be conducted using outboard flap assembly 29 described and shown herein but the use of method 900 is not limited to the specific exemplary embodiments of outboard flap assembly 29 described herein. Aspects of outboard flap assembly 29 described and shown herein may also be applicable to method 900.

In various embodiments, method 900 may comprise: guiding an aft portion of outboard flap 28 along elongated track member 36C as outboard flap 28 moves toward the deployed position (see block 902); guiding a forward portion of outboard flap 28 along elongated track member 36C as outboard flap 28 moves toward the deployed position (see block 904); and accommodating transverse movement of the forward portion of outboard flap 28 relative to elongated track member 36C (see block 906) as outboard flap 28 moves toward the deployed position.

In some embodiments, method 900 may comprise accommodating lateral (e.g., sideways) movement of the forward portion of outboard flap 28 relative to elongated track member 36C.

In some embodiments, method 900 may comprise causing outboard flap 28 to undergo Fowler motion as outboard flap 28 moves toward the deployed position.

In some embodiments, method 900 may comprise guiding the aft portion of outboard flap 28 toward an outboard direction relative to wing 12.

In some embodiments, method 900 may comprise guiding outboard flap 28 generally toward a streamwise direction.

In some embodiments of method 900, track member 36C may be at least partially embedded into outboard flap 28.

In some embodiments, method 900 may comprise accommodating a skewing movement of the outboard flap 28.

In some embodiments, method 900 may comprise guiding the aft portion of outboard flap 28 along a first track (e.g., aft track 44) of elongated track member 36C and guiding the forward portion of outboard flap 28 along a second track (e.g., forward track 46) of elongated track member 36C where the first track is separate from the second track.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. The present disclosure may be embodied in other specific forms without departing from the subject matter of the claims. Also, one skilled in the relevant arts will appreciate that while the assemblies, couplers and methods disclosed and shown herein may comprise a specific number of elements/components, the assemblies, couplers and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A trailing edge flap assembly for a wing of an aircraft, the trailing edge flap assembly comprising:
   a trailing edge flap movable between a retracted position and a deployed position;
   an elongated track member configured to be fixedly secured to a structure of the wing;
   an aft coupler movably coupling an aft portion of the trailing edge flap to the elongated track member, the aft coupler guiding the aft portion of the trailing edge flap along the elongated track member as the trailing edge flap moves toward the deployed position; and
   a forward coupler movably coupling a forward portion of the trailing edge flap to the elongated track member, the forward coupler guiding the forward portion of the trailing edge flap along the elongated track member as the trailing edge flap moves toward the deployed position, the forward coupler accommodating transverse movement of the forward portion of the trailing edge flap relative to the elongated track member,
   wherein:
      the forward coupler comprises a carriage movably coupled to the elongated track member at a first location on the elongated track member;
      the aft coupler is movably coupled to the elongated track member at a second location on the elongated track member, the second location being spaced apart from the carriage alarm the elongated track member;
      the forward portion of the flap is movably coupled to the carriage by an articulated connection including:
         a pivot beam pivotally coupled to the carriage;
         a first link pivotally coupled to the pivot beam, the first link being pivotally coupled to a first coupling point on the trailing edge flap; and
         a second link pivotally coupled to the pivot beam, the second link being pivotally coupled to a second coupling point on the trailing edge flap, the first coupling point and the second coupling point being disposed on opposite sides of the elongated track member.

2. The assembly as defined in claim 1, wherein the forward coupler accommodates lateral movement of the forward portion of the trailing edge flap relative to the elongated track member.

3. The assembly as defined in claim 1, wherein the elongated track member is configured to cause the trailing edge flap to undergo Fowler motion.

4. The assembly as defined in claim 1, wherein an aft portion of the elongated track member deviates toward an outboard direction relative to the wing.

5. The assembly as defined in claim 1, wherein at least part of the elongated track member extends generally in a streamwise direction relative to the wing.

6. The assembly as defined in claim 1, wherein the elongated track member defines an aft track for guiding the aft coupler and a forward track for guiding the forward coupler where the aft track is separate from the forward track.

7. The assembly as defined in claim 1, wherein the elongated track member is at least partially embedded into the trailing edge flap.

8. The assembly as defined in claim 1, wherein:
the first link is pivotally coupled to a first end of the pivot beam;
the second link is pivotally coupled to a second end of the pivot beam; and
an intermediate portion of the pivot beam is pivotally coupled to the carriage, the intermediate portion being disposed between the first end and the second end of the pivot beam.

9. The assembly as defined in claim 1, wherein the trailing edge flap comprises a cut-out for receiving the elongated track member.

10. The assembly as defined in claim 9, wherein the first coupling point and the second coupling point are disposed on opposite sides of the cut-out.

11. The assembly as defined in claim 1, wherein the pivot beam is oriented obliquely to the elongated track member.

12. The assembly as defined in claim 1, wherein the carriage is disposed under the elongated track member.

13. The assembly as defined in claim 1, wherein the forward coupler accommodates a skewing movement of the trailing edge flap.

14. The assembly as defined in claim 1, wherein:
the elongated track member is an inboard elongated track member for guiding movement of an inboard portion of the trailing edge flap; and
the assembly comprises an outboard elongated track member configured to be fixedly secured to the structure of the wing for guiding movement of an outboard portion of the trailing edge flap.

15. The assembly as defined in claim 14, wherein the inboard elongated track member and the outboard elongated track member are configured to cause skewing of the trailing edge flap during deployment of the trailing edge flap.

16. The assembly as defined in claim 1, wherein the trailing edge flap defines at least part of a swept trailing edge of the wing when the trailing edge flap is in the retracted position.

17. An aircraft comprising the assembly as defined in claim 1.

* * * * *